Patented June 16, 1936

2,044,758

UNITED STATES PATENT OFFICE 2,044,758

AQUEOUS SUSPENSION COMPOSITIONS

Roy Cross and Matthew Forbes Cross, Kansas City, Mo.

No Drawing. Application March 23, 1936, Serial No. 70,554

6 Claims. (Cl. 252—6)

This invention relates to an aqueous composition primarily for suspension purposes. It more specifically has to do with a fluid mixture of certain types of natural zeolitic clays in combination with mineral waters and brines of various types. For the purpose of this disclosure, brine may be considered as any saline solution or mineral water, natural or synthetic but more particularly, a solution of such salts as sodium chloride, calcium chloride, magnesium chloride, zinc chloride and zinc sulphate. When any of these brines are used as a medium for suspension of ordinary clays, such, for instance, as kaolin and bentonite, the clay particles even though of colloidal size, are flocculated and the mixture separates into a flocculated mass at the bottom of the container with clear brine above. A sol or viscous gel of clay or bentonite is completely flocculated and its homogeneity destroyed when it is acted upon by brine.

We have discovered that certain zeolitic clays such as are found in northern Florida and southern Georgia and are mined, for example, at Attapulgus, Georgia, Jamieson, Quincy and Ocala, Florida, behave peculiarly in the presence of brines. Ordinary clay or bentonite having ultimate natural particles of colloidal size when suspended in water may form a viscous mass of gel-like consistency but upon addition of saline material or brine, the particles are agglomerated or agglutinated and precipitated leaving a clear supernatant non-viscous liquor at the top of the container. Zeolitic clay or fuller's earth from Florida and Georgia (floridin) having particles of colloidal size, forms with distilled water a viscous mixture or gel which is not flocculated by salts or brine but maintains its smooth viscous, colloidal gelatinous nature. In fact, this zeolitic clay even in low concentrations such as 1% to 5% forms with natural waters, highly mineralized waters and brines, a smooth viscous, nonflocculated gelatinous mixture without agglomeration or agglutination of the colloidal or microscopic particles.

Whereas kaolin, bentonite and all ordinary types of clay are completely flocculated by brines of low concentrations, we have discovered that fuller's earth of the Florida-Georgia type forms highly viscous mixtures not only with distilled water but with natural waters and brines and without flocculation. Even saturated brines such as saturated sodium chloride, saturated calcium chloride and solutions of zinc chloride do not bring about flocculation of such clays. In no case is there any tendency for the suspended matter to separate out leaving the clear liquor above in any of the ordinary concentrations of clay used. The most useful concentrations vary from 1% to 10% dependent upon the character of the particular clay used. These concentrations with distilled water yield a viscosity in terms of centipoises as determined by the Stormer viscosimeter of from 0 to 80.

A table setting out the viscosity of certain brines containing floridin as compared with bentonite and kaolin is shown below:

Viscosity (in centipoises) of fuller's earth of the Florida-Georgia type mixtures in various brines

| Floridin | Distilled water | 5% sodium chloride | 20% sodium chloride | 35% calcium chloride | 36% zinc chloride |
|---|---|---|---|---|---|
| Percent | | | | | |
| 1 | 1 | 1 | 1 | 1 | 1 |
| 2 | 4 | 4 | 4 | 7 | 5 |
| 3 | 9 | 9 | 9 | 11 | 9 |
| 4 | 21 | 18 | 17 | 17 | 17 |
| 5 | 38 | 30 | 24 | 24 | 24 |
| 6 | 79 | 55 | 51 | 37 | 38 |

Viscosity (in centipoises) of bentonite, Aquagel and kaolin mixtures

| Clay | Bentonite | | Aquagel | | Kaolin | |
|---|---|---|---|---|---|---|
| | Distilled water | 5% brine | Distilled water | 5% brine | Distilled water | 5% brine |
| Percent | | | | | | |
| 1 | 0 | 0 | 0 | 0 | 0 | 0 |
| 2 | 0 | 0 | 2.0 | 0 | 0 | 0 |
| 3 | 0 | 0 | 4.0 | 0 | 0 | 0 |
| 4 | 5 | 0 | 6.5 | 0 | 0 | 0 |
| 5 | 11 | 0 | 30.0 | 0 | 0 | 0 |

Note: "Aquagel" is the trade name for bentonite to which approximately 2½% of magnesium oxide or Portland cement has been added. No substantial increase in viscosity was developed by adding bentonite, Aquagel or kaolin to any of the brine or salt solutions.

This invention provides for producing gelatinous or highly viscous fluids from brines having a specific gravity of 1.01 to 2.25, the viscosity being controlled to any degree desired by the addition of fuller's earth of the character herein described. For example, a viscous fluid varying from 1 to 80 centipoises may be made weighing as much as 17.8 pounds per gallon. With a saturated sodium chloride solution a viscosity of 0-80 centipoises and with a weight per gallon of ten pounds may also be obtained. The heaviest viscous mixture may be made with zinc chloride, the next heaviest with calcium chloride and the one meeting most requirements and cheapest, with sodium chloride. For ordinary purposes, a viscosity between 5 and 50 centipoises is most desirable.

This heavy viscous aqueous fluid may be used for a great variety of purposes including suspending, flotation, making emulsions and for increasing hydrostatic pressure. It may be used in connection with ore separation, coal washing, sand cleaning, salt purification, well drilling, salt water washing, salt glazing of ceramic objects and other uses. In coal washing, the brine suspension is particularly useful in the separation of slate and pyrites; in ore washing, in the separation of country rock from ore; in salt glazing for uniform suspension and covering of the salt, and for well drilling in the increased viscosity to carry out cuttings to prevent caving, to avoid loss of circulation and increase hydrostatic head. By way of illustration in the ordinary oil well mud, the viscosity is destroyed when salt or brines are encountered as the salt causes flocculation and separation of colloidal shale, ordinary clay, Aquagel or bentonite. For example, an Aquagel mud composed of 20% Aquagel and 80% salt water gives a viscosity of only 4 which is only equal in viscosity to a mixture of 2% floridin in 98% salt water. The floridin is ten times as effective. In many places, in the Mid-Continent field of the United States, it is necessary to drill through thick strata of pure rock salt. In using the ordinary drilling mud for the purpose of lifting the cuttings, the menstruum being fairly pure water with no brine, the water rapidly dissolves the salt and causes caving of the hole accompanied by flocculation of the mud. However, when a saturated brine is used along with zeolitic clay or fuller's earth as set out in this invention, the rock salt is not dissolved to any degree, the mul is not flocculated and the mud performs all of the other functions required of it. In drilling through sandstone, it is commonly the case that mud with fresh water, loosens the binder of the sandstone and causes caving. This is particularly the action with those sandstones which contain considerable amounts of mineral water or salt water. With the salt water-fuller's earth suspension, the sandstone is not attacked but is sealed, the viscosity is maintained and there is no loss of liquor into the formation or loss of circulation which might tend to cause a blow-out if there is gas pressure in the well. In many districts, for example, along the Gulf Coast of Texas, the drilling bit encounters what is known as "heaving shale" locally spoken of in Texas as the "Jackson shale". This shale has caused hundreds of thousands of dollars loss due to the fact that fresh water drilling mud attacks the saline matter in the shale causing it to heave or fall into the hole and obstruct the drilling. In many cases, it has not been possible with the fresh water drilling mud to penetrate through the Jackson shale. With the salt water-fuller's earth and with the viscosity between 5 and 50, little trouble is encountered as the salt water does not attack the shale and no caving results. The salt water suspension also facilitates the removal of the cuttings that are carried from the hole by the circulation. Another advantage of the salt water suspension as a drilling fluid is due to the fact that it does not freeze. In many cases, fresh water drilling mud has frozen and stopped operations in cold weather. In certain instances, we find that there is some corrosion due to the salt in the brine used for making the suspension. To prevent this corrosion of certain metals, it is desirable to use an inhibitor of any of the well known types that are used in connection with the pickling of metals before plating. Among these are quinoline ethiodide and arsenicals.

Although the salt water drilling fluid confers all the fluid head necessary in practically all cases, it is rarely desirable but possible to still further increase the weight. When additional weight is desired, the combination of heavy suspended material such as powdered barytes or lead sulphide may be used to increase the weight per gallon up to 24 pounds per gallon. A combination of fuller's earth of the Florida-Georgia character with saturated brine to which barytes or lead sulphide has been added, provides for the heaviest fluid aqueous material.

In the compounding of the products disclosed in the various aspects of this invention, the use of a good mixing device is very important and in many cases necessary. A dispersion mill which will reduce particles to their ultimate natural discrete state in aqueous medium is described in co-pending application Serial Number 68,282 filed March 11, 1936. In the use of this or similar dispersion mills, the clay is mixed with the brine before or simultaneously with the introduction into the mill. Any other substance to be dispersed into the brine may be added at the same time but it is usually preferable to mix additional ingredients in subsequent runs after first making the brine mixture. This is particularly desirable in the making of emulsions. The best method of mixing will be apparent to the skilled operator in each individual condition.

It is to be understood that although this invention has been described with particular reference to clays found in Florida and Georgia, the claims on the other hand are directed not to clays from any particular geographical location but on the contrary include clays of this type having these characteristics wherever found and however prepared.

Having thus described our invention, what we claim as new and desire to secure by Letters Patent of the United States is:

1. As a new and improved composition of matter, a gelatinous suspension adapted to be employed for dispersion purposes, said suspension having a viscosity of from 1 to 80 centipoises, a specific gravity of from 1.01 to 2.25 and being composed of a brine having suspended therein from 1 to 10% of fuller's earth of the Florida-Georgia type.

2. As a new and improved composition of matter, a gelatinous suspension adapted to be employed for dispersion purposes, said suspension having a viscosity of from 5 to 50 centipoises, a specific gravity of from 1.01 to 2.25 and being composed of a brine having suspended therein from 1 to 10% of fuller's earth of the Florida-Georgia type.

3. As a new and improved composition of matter, a gelatinous suspension adapted to be employed for dispersion purposes, said suspension having a viscosity of from 1 to 80 centipoises, a specific gravity of from 1.01 to 2.25 and being composed of a sodium chloride brine having suspended therein from 1 to 10% of fuller's earth of the Florida-Georgia type.

4. As a new and improved composition of matter, a gelatinous suspension adapted to be employed for dispersion purposes, said suspension having a viscosity of from 1 to 80 centipoises, a specific gravity of from 1.01 to 2.25 and being composed of a calcium chloride brine having suspended therein from 1 to 10% of fuller's earth of the Florida-Georgia type.

5. As a new and improved composition of matter, a gelatinous suspension adapted to be employed for dispersion purposes, said suspension having a viscosity of from 1 to 80 centipoises, a specific gravity of from 1.01 to 2.25 and being composed of a zinc chloride brine having suspended therein from 1 to 10% of fuller's earth of the Florida-Georgia type.

6. A gelatinous suspension adapted for the preparation of dispersions in the presence of brine and which is not flocculated by the brine characterized by a specific gravity of not more than about 2.25, a viscosity of 5 to 50 centipoises and being composed of water having suspended therein from 1 to 10% of fuller's earth of the Florida-Georgia type.

ROY CROSS.
MATTHEW FORBES CROSS.